United States Patent Office 3,437,166
Patented Apr. 8, 1969

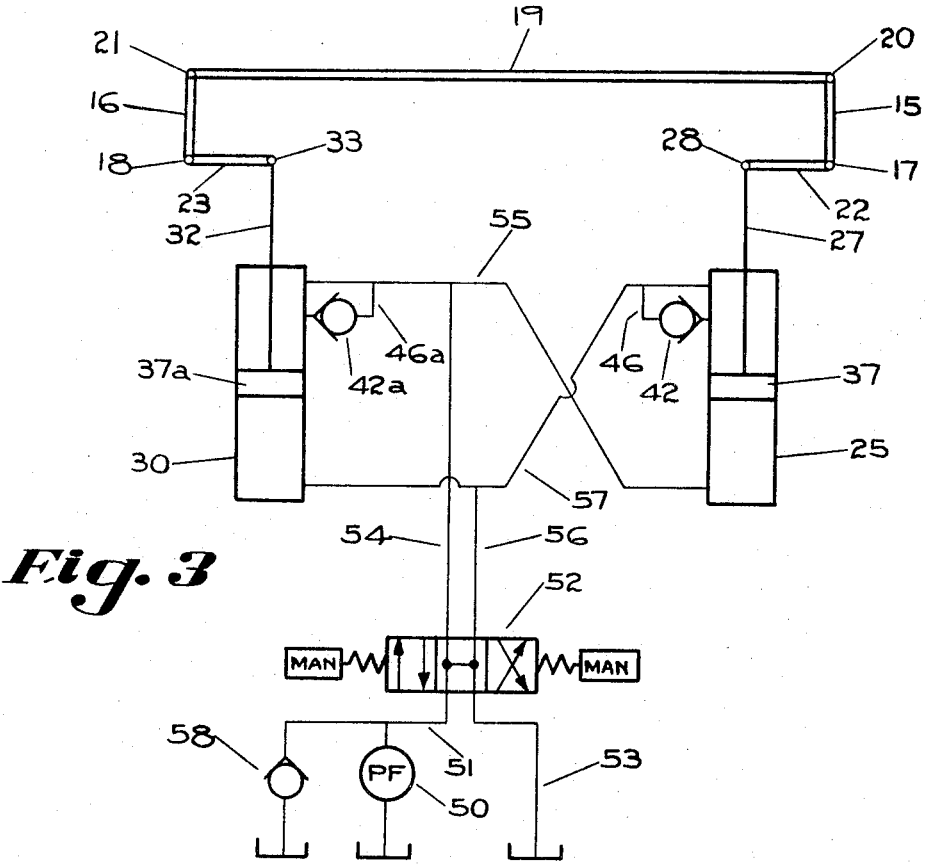

3,437,166
STEERING SYSTEM FOR VEHICLES
Robert E. Stauffer, Galion, Ohio, assignor to Jeffrey Galion Manufacturing Company, a corporation of Ohio
Filed May 17, 1967, Ser. No. 639,171
Int. Cl. B62d 5/10, 3/14
U.S. Cl. 180—79.2
9 Claims

ABSTRACT OF THE DISCLOSURE

A steering system for a vehicle with a push-pull mechanical linkage to turn the steering wheels. A pair of hydraulic cylinders is connected to the push-pull linkage, and the cylinders are oppositely extended and contracted to operate the linkage. Hydraulic fluid is supplied to opposite ends of the respective cylinders to extend and contract the cylinders. Each cylinder has hydraulic fluid bypass means, and at the limit steering condition of the cylinders in either direction of steering, the supply hydraulic fluid may bypass to the return flow of hydraulic fluid.

---

The instant invention relates to steering systems for vehicles that have hydraulic cylinders as the power devices for steering the wheels of the vehicle.

In vehicles in which the steering is accomplished by hydraulic cylinders which turn the steering wheels, the extent to which the wheels are turned is determined by the stroke of the hydraulic cylinders. At the limit position of the steering wheels in one direction or the other direction, the pistons of the cylinders are at the limits of their strokes. In a steering system with a hydraulic booster circuit there is relief valve noise at the limit of the steering operation at which the pistons in the cylinders are at the limits of their strokes. Continued and prolonged tight turning of the vehicle, in which the steering wheels are turned to their limit positions, produces relief valve noise, generates heat in the hydraulic system that results in a power loss, produces excessive pump wear, and also produces excessive wear of the pump drive components. All of these conditions are undesirable.

In a hydraulic steering system which is flow regulator controlled, the hydraulic fluid for powering the steering cylinders is metered off from the larger flow output of the pump. In this type of steering system there may be provided a constant supply of hydraulic fluid for the steering function through the entire speed range of the engine which drives the hydraulic pump for supplying the hydraulic steering system, and still have sufficient supply volume of hydraulic fluid to supply other hydraulic devices in the same system. However, in a tight turn to the steering limit position there may be a build-up of pressure in the hydraulic steering cylinder to such magnitude that it is relieved by the system relief valve. In such event, the entire supply of hydraulic fluid from the pump is at the relief valve pressure, which results in a substantial horsepower loss in the system.

In the hydraulic steering system which is constructed in accordance with this invention, each hydraulic cylinder has bypass means for the hydraulic fluid. Then at the limit steering condition the bypass means of one cylinder or the other cylinder operates to bypass supply hydraulic fluid to the return flow of hydraulic fluid, so that there is a continuous flow of hydraulic fluid, and there will be no interruption of the supply of hydraulic fluid to other hydraulic devices that may be included in the system.

It is an object of the instant invention to provide an improved hydraulic steering system for vehicles, which overcomes the aforementioned disadvantages of hydraulic steering systems.

It is another object of the instant invention to provide an improved hydraulic steering system in which continuous flow of the hydraulic fluid may be maintained at the limit condition of steering in either direction.

It is a further object of the instant invention to provide an improved hydraulic steering system in which the hydraulic fluid is bypassed at the steering limit condition, in order to reduce power losses of the hydraulic pump.

It is still another object of the instant invention to provide an improved hydraulic steering system in which the steering cylinder is provided with a check valve bypass means for bypassing hydraulic fluid at the end of the stroke of the piston.

Other objects of the invention will appear hereinafter, the novel features and combinations being set forth in the appended claims.

In the drawings:

FIG. 3 is a diagrammatic illustration of the hydraulic steering system.

Figure 1:
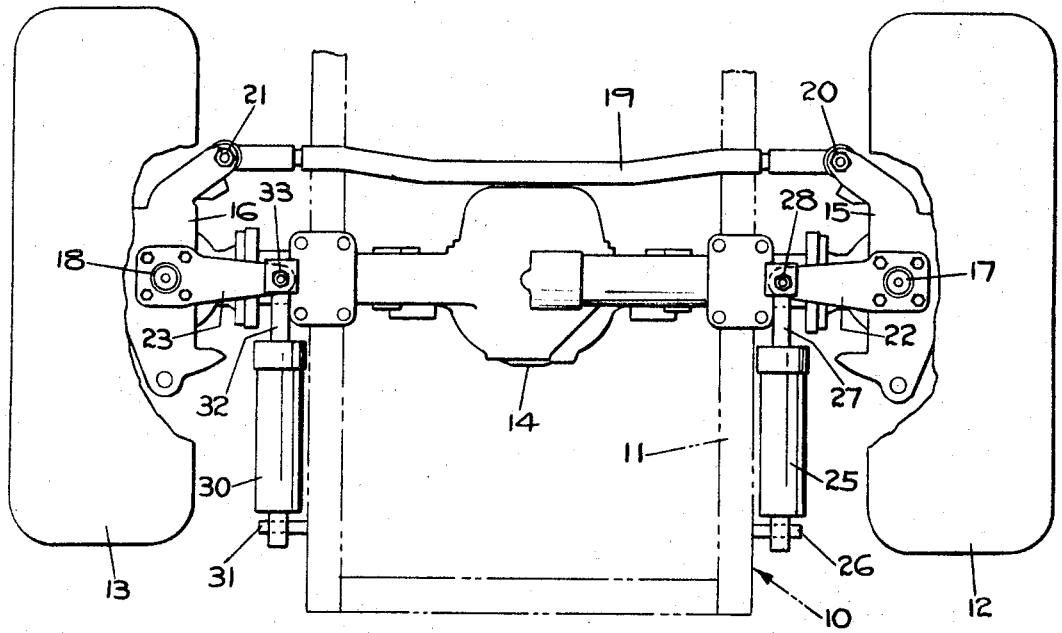
FIG. 1 shows the vehicle steering mechanism.

Referring to the drawings, there is illustrated in FIG. 1 a vehicle 10 with a main frame or chassis 11, which is diagrammatically represented. The vehicle 10 has steering wheels 12, 13 at opposite sides of the chassis 11 to support the vehicle 10 on the ground. There is an axle 14 which is secured to the main frame 11 and extends transversely between the opposite steering wheels 12, 13.

The steering wheels 12, 13 are rotatably mounted at opposite ends of the axle 14, on steering links 15, 16, respectively. The steering link 15 and the steering wheel 12 are on an upright pivot 17 around which the steering wheel 12 may be turned in opposite directions. Likewise, the steering link 16 and the steering wheel 13 are on an upright pivot 18 around which the steering wheel 13 may be turned in opposite directions.

A tie rod 19 extends transversely between the steering links 15, 16. An upright pivot 20 connects one end of the tie rod 19 to the steering link 15, and an upright pivot 21 connects the other end of the tie rod 19 to the steering link 16. Thus, the steering links 15, 16 are connected by the tie rod 19 so that the steering wheels 12, 13 are turned together in the same direction on the upright pivots 17, 18, respectively. An actuating arm or link 22 is fixedly secured to the steering link 15, and a like actuating arm or link 23 is fixedly secured to the steering link 16.

A first double acting steering cylinder 25 is mounted at one side of the chassis 11 with its base end on a pin 26. The piston rod 27 of the cylinder 25 is connected to the actuating arm 22 by an upright pivot 28. At the opposite side of the chassis 11 there is a second double acting steering cylinder 30 which is similarly mounted on the chassis 11 with its base end on a pin 31. The piston rod 32 is connected to the actuating arm 23 by an upright pivot 33.

In turning the steering wheels 12, 13 for steering the vehicle 10, one of the steering cylinders 25, 30 is extended, and the other is retracted, which is to say that the cylinders 25, 30 operate in opposite directions. The mechanical steering linkage for the steering wheels 12, 13 is a push-pull linkage, in which one of the steering cylinders 25, 30 applies a pushing force, while the other of the steering cylinders 25, 30 applies a pulling force.

Figure 2:
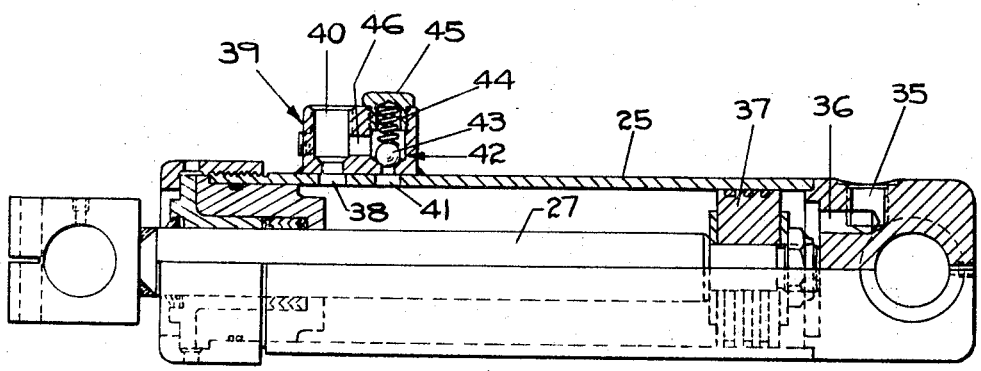
FIG. 2 is a partial sectional view of the steering cylinder.

Each of the cylinders 25, 30 may be constructed as shown in FIG. 2, and it will be understood that the following description of hydraulic steering cylinder 25 applies also to hydraulic steering cylinder 30. At the base end of the cylinder 25 there is a first port 35 for hydraulic fluid, and a passage 36 that connects the port 36 to the interior of the cylinder 25 to supply hydraulic fluid to the piston 37 for extending the cylinder 25 by moving the piston rod 27 in its first power stroke to the left as viewed in FIG. 2.

At the piston rod end of the cylinder 25 there is a second port 38 for hydraulic fluid, which is formed in the wall of the cylinder. A fitting 39 is secured to the exterior surface of the wall of the cylinder 25, as by welding, and it has a fluid passage 40 as an extension of the second port 38. Hydraulic fluid is supplied through the passage 40 and the second port 38 to move the piston 37 in its second power stroke to the right as viewed in FIG. 2, which contracts the cylinder 25. The cylinder 25 may be a conventional double acting hydraulic cylinder with the fitting 39 secured to the exterior surface of the cylinder wall as shown in FIG. 2.

Ahead of the second port 38 there is a bypass port 41, which is also formed in the wall of the cylinder 25. The fitting 39 has a bypass check valve 42 that is placed above the bypass port 41. The bypass check valve 42 has a ball 43 and a spring 44 to back the ball 43 and to press it to its seated position. A plug 45 closes the fitting 39 above the check valve 42 and provides a seat for the spring 44.

In the operation of the steering cylinder 25, the piston 37 is moved in its first power stroke to the left, as viewed in FIG. 2, by hydraulic fluid admitted through the first port 35 and the passage 36. When the piston 37 is moved to the end of its first power stroke, which is the steering limit position of the steering wheels 12, 13, the piston 37 clears the bypass port 41 so that the latter is exposed to the hydraulic fluid. The pressure of the hydraulic fluid in the cylinder 25 is considerably higher than the setting of the bypass check valve 42, and therefore, the bypass check valve 42 is opened by the pressure of the hydraulic fluid and there is then a bypass flow of the hydraulic fluid through the bypass port 41, the connecting passage 46, and out from the fluid passage 40.

Such bypass flow of the hydraulic fluid reduces the pressure of the hydraulic fluid on the piston 37. There is a force on the steering wheels 12, 13 which tends to restore the steering wheels 12, 13 from their limit steering position, and such force acting through the steering linkage is communicated to the cylinder 25 and tends to move the piston 37 to the right, as viewed in FIG. 2. Such reverse movement of the piston 37 causes a throttling of the bypass flow through the bypass port 41, and may close the port 41, and this restores the hydraulic fluid pressure on the piston 37, in order to continue to steer the vehicle 10. In the steering operation the hydraulic cylinders 25, 30 act in opposite directions, so that at the steering limit position of the steering wheels 12, 13, in either direction, there is a bypass flow of the hydraulic fluid from one or the other of the cylinders 25, 30, as will be described hereafter.

In the second power stroke of the piston 37, which is to the right as viewed in FIG. 2, the hydraulic fluid is applied through the fluid passage 40 and the port 38 to the rod side of the piston 37. When the piston rod 27 is fully extended, the pressure of the hydraulic fluid is communicated through the connecting fluid passage 46 to the check valve 42 to maintain the latter in closed condition. The pressure of the supply hydraulic fluid then acts on the rod side of the piston 37 for the second stroke thereof toward the base end of the cylinder 25.

The hydraulic steering system is diagrammatically illustrated in FIG. 3. A pump 50 delivers hydraulic fluid under pressure to a three position directional valve 52. The valve 52 may be open center, manually operated to control the direction of flow. A line 53 returns the hydraulic fluid from the valve 52 to the tank. A line 54 connects from the valve 52 to a line 55 which is connected between the base end of the cylinder 25 and the piston rod end of the cylinder 30. A line 56 connects from the valve 52 to a line 57 which is connected between the piston rod end of the cylinder 25 and the base end of the cylinder 30. The lines 54, 55 and the lines 56, 57 may alternately act as supply lines and return lines for hydraulic fluid, to the cylinders 25, 30, respectively, as explained hereafter.

When the steering wheels 12, 13 are to be turned to the right, as viewed in FIGS. 1 and 3, the valve 52 is operated to supply hydraulic fluid through lines 54, 55 to the base end of steering cylinder 25 and to the piston rod end of steering cylinder 30. When the piston rod 32 of cylinder 30 is fully extended, the pressure of the supply hydraulic fluid is communicated to the bypass check valve 42a through the passage 46a and maintains the bypass check valve 42a closed, thereby applying the pressure of the supply hydraulic fluid to the rod side of piston 37a. The lines 56, 57 serve as return lines for the hydraulic fluid from the piston rod end of the cylinder 25 and from the base end of the cylinder 30. The cylinder 25 is extended, and the cylinder 30 is contracted. If the steering cylinder 25 is fully extended and the steering cylinder 30 is fully contracted, the piston 37 of the former moves to the end of its first power stroke in the cylinder 25, and the steering wheels 12, 13 are moved to their limit steering positions.

In moving the piston 37 to the end of its first power stroke, it clears the bypass check valve 42. The bypass check valve 42 is set at a lower pressure than the pressure of the hydraulic fluid in the steering cylinder 25. Accordingly, when the check valve 42 is exposed to the hydraulic fluid in the cylinder 25, it is unseated by the pressure of such fluid, and there is a bypass flow of hydraulic fluid from the cylinder 25 through the bypass check valve 42 and the passage 46, the latter being represented in FIG. 3 as a hydraulic line. The bypass check valve 42 is in parallel with the return line 57 and is connected to the latter by the passage 46.

There is a restoring force acting on the steering wheels 12, 13, which is transmitted to the pistons 37, 37a. Such restoring force acting on the piston 37 tends to return the latter, with the effect of throttling or blocking the bypass flow of hydraulic fluid through the bypass check valve 42. This restores the pressure of the hydraulic fluid in the cylinder 25, acting to maintain the piston 37 at the end of its first power stroke and the steering wheels 12, 13 at their limit steering positions. Since the hydraulic fluid can bypass through the bypass check valve 42, the system relief valve 58 will not be opened, because there is no increase of pressure of the hydraulic fluid at the limit steering condition, and thus, there will be a continuous supply of hydraulic fluid under pressure in the system from the pump 50. This makes the hydraulic fluid available to operate other hydraulic devices which may be included in the same system with the hydraulic steering devices.

When turning the steering wheels 12, 13 to the left, as viewed in FIGS. 1 and 3, the lines 56, 57 are the supply lines for the cylinders 25, 30 to supply hydraulic fluid to the piston rod end of the steering cylinder 25 to contract the latter, and to the base end of the steering cylinder 30 to extend the latter. When the piston rod 27 of cylinder 25 is fully extended, the pressure of the supply hydraulic fluid acting through the passage 46 maintains the bypass check valve 42 closed, thereby applying the pressure of the supply hydraulic fluid to the rod side of piston 37. If the piston 37a is moved to the end of its first power stroke to put the steering wheels 12, 13 in their limit steering positions, then the piston 37a will clear the check valve 42a, and the check valve 42a is then exposed to the hydraulic fluid in the cylinder 25. Such hydraulic fluid will then bypass through the bypass check valve 42a and the passage 46a which is in parallel with the return line 55 and connects to the return line 55 and to the return line 54. The operation in turning the steering wheels 12, 13 to the left is the same as that of turning the steering wheels 12, 13 to the right, except that it is in the opposite direction, and the supply and return hydraulic lines are reversed in their function.

Having thus described and shown an embodiment of the invention, what it is desired to secure by Letters Patent of the United States is:

1. A steering system for a vehicle in which there are two steering wheels that support the vehicle on the ground, steering pivot means for mounting each of said wheels on said vehicle, a first double acting hydraulic cylinder for steering one wheel in opposite directions on said steering pivot means, a second double acting hydraulic cylinder for steering the other wheel in opposite directions on said steering pivot means, each said hydraulic cylinder including a piston that is movable in the cylinder in a first power stroke in one direction and in a reverse power stroke in the reverse direction, first means to supply hydraulic fluid under pressure to said hydraulic cylinders to move the piston of the first hydraulic cylinder to the end of its first power stroke and to move the piston of the second hydraulic cylinder to the end of its reverse power stroke, second means to supply hydraulic fluid under pressure to said hydraulic cylinders to move the piston of the first hydraulic cylinder to the end of its reverse power stroke and to move the piston of the second hydraulic cylinder to the end of its first power stroke, pressure responsive means for each said hydraulic cylinder that is operative at the end of the first power stroke of said piston in response to the pressure of said hydraulic fluid to permit flow of the hydraulic fluid from the respective one of said hydraulic cylinders.

2. A steering system for a vehicle as recited in claim 1 in which said first means to supply hydraulic fluid under pressure comprises a first line for hydraulic fluid connected between the lower end of said first hydraulic cylinder and the upper end of said second hydraulic cylinder, said second means to supply hyraulic fluid under pressure comprises a second line for hydraulic fluid connected between the upper end of said first hydraulic cylinder and the lower end of said second hydraulic cylinder, said hydraulic fluid under pressure being supplied to said first and second hydraulic cylinders through one of said hydraulic lines and being returned from said hydraulic cylinders through the other of said hydraulic lines, said pressure responsive means being at the upper end of each hydraulic cylinder in order to bypass hydraulic fluid through one of said hydraulic lines with the return hydraulic fluid at the end of the said first power stroke of the piston.

3. A steering system for a vehicle as recited in claim 2 in which said pressure responsive means comprises a check valve connected to the upper end of the hydraulic cylinder to be exposed to the hydraulic fluid when said piston is at the end of its first power stroke, and the discharge side of said check valve is connected to one of said hydraulic lines for discharging the hydraulic fluid with the return flow of hydraulic fluid.

4. A steering system for a vehicle as recited in claim 3 in which each hydraulic cylinder has a port at its upper end to supply hydraulic fluid under pressure for said reverse power stroke, said first hydraulic line and said second hydraulic line are connected to said ports of said first hydraulic cylinder and said second hydraulic cylinder, respectively, and each said upper end port is connected to the discharge side of the check valve to maintain the check valve closed when hydraulic fluid under pressure is supplied through said port.

5. A steering system for a vehicle as recited in claim 3 in which each hydraulic cylinder has a port at its upper end to supply hydraulic fluid under pressure for said deverse power stroke, said first hydraulic line and said second hydraulic line are connected to said ports of said first hydraulic cylinder and said second hydraulic cylinder, respectively, a fitting that is secured to each hydraulic cylinder, said check valve being disposed in said fitting, a first flow passage in said fitting that is connected to said upper end port and to one of said hydraulic lines, a bypass flow passage to connect the discharge side of said check valve to said first flow passage for flow of hydraulic fluid from said check valve through the bypass flow passage and through the first flow passage to said one hydraulic line.

6. A steering system for a vehicle as recited in claim 1 in which there is a first steering link for steering one of said wheels on said steering pivot means, a second steering link for steering another of said wheels on said steering pivot means, a tie rod connecting said first steering link and said second steering link to form a push-pull linkage for turning said steering wheels, said first hydraulic cylinder being connected to said first steering link and said second hydraulic cylinder being connected to said second steering link to apply pushing and pulling forces to said first and second steering links in which said first hydraulic cylinder pushes said first steering link on its first power stroke and pulls said first steering link on its second power stroke and said second hydraulic cylinder pushes said second steering link on its first power stroke and pulls said second steering link on its second power stroke, and said first hydraulic cylinder and said second hydraulic cylinder being operated in opposite directions to steer said steering wheels together.

7. A steering system for a vehicle in which there are two steering wheels that support the vehicle on the ground, steering pivot means for mounting each of said wheels on said vehicle, a double acting hydraulic cylinder for steering said wheels in opposite directions on said steering pivot means, said hydraulic cylinder including a piston that is movable in the cylinder in a first power stroke in one direction and in a reverse power stroke in the reverse direction, first means to supply hydraulic fluid under pressure to said hydraulic cylinder to move the piston of said hydraulic cylinder to the end of its first power stroke, second means to supply hydraulic fluid under pressure to said hydraulic cylinder to move the piston of said hydraulic cylinder to the end of its reverse power stroke, pressure responsive means for said hydraulic cylinder that is operative at the end of the first power stroke of said piston in response to the pressure of said hydraulic fluid to permit flow of the hydraulic fluid from said hydraulic cylinder.

8. A steering system for a vehicle as recited in claim 7 in which there is a first steering link for steering one of said wheels on said steering pivot means, a second steering link for steering another of said wheels on said steering pivot means, a tie rod connecting said first steering link and said second steering link to form a push-pull linkage for turning said steering wheels, said hydraulic cylinder being connected to said push-pull linkage to apply pushing and pulling forces to said push-pull linkage in which said hydraulic cylinder pushes said push-pull linkage on its first power stroke and pulls said push-pull linkage on its second power stroke, and said hydraulic cylinder is operated in opopsite directions to steer said steering wheels together.

9. A steering system for a vehicle as recited in claim 7 in which said pressure responsive means comprises a check valve that is opened by the pressure of the hydraulic fluid at the end of the first power stroke.

References Cited

UNITED STATES PATENTS

| 2,112,466 | 3/1938 | Maloon. | |
| 3,159,230 | 12/1964 | Gordon. | |
| 3,227,238 | 1/1966 | Strader | 180—79.2 |
| 3,240,285 | 3/1966 | Williamson | 180—79.2 |

FOREIGN PATENTS

| 669,101 | 3/1952 | Great Britain. |

LEO FRIAGLIA, *Primary Examiner.*

J. A. PEKAR, *Assistant Examiner.*

U.S. Cl. X.R.

60—52; 91—412